Nov. 12, 1968     A. HEY     3,409,939
APPARATUS FOR THE MANUFACTURE OF HOLLOW ARTICLES
Filed Nov. 29, 1965
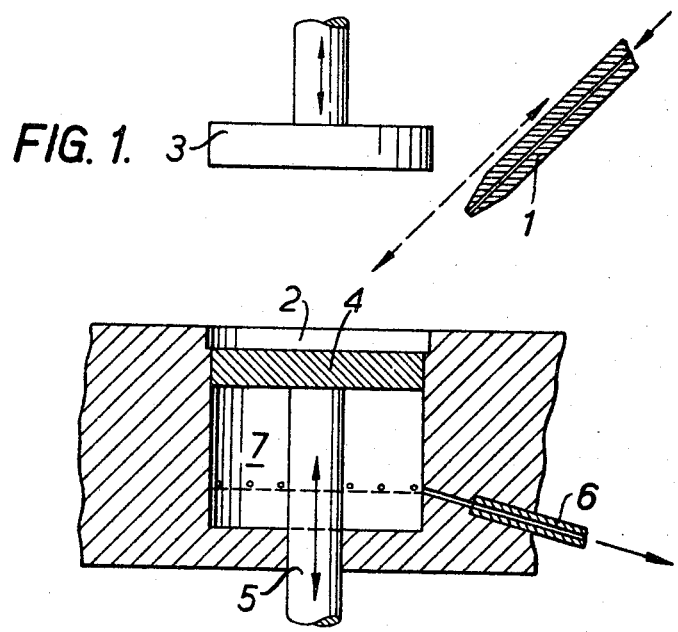
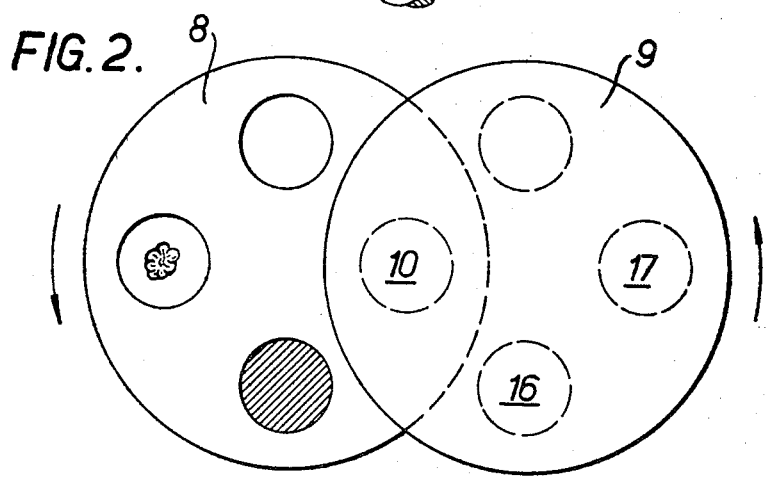
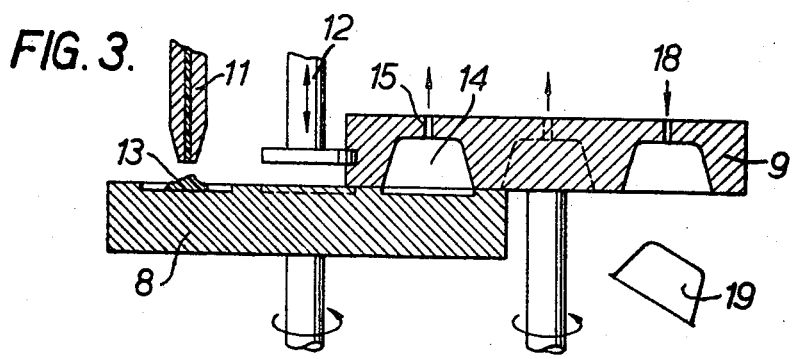

United States Patent Office 3,409,939
Patented Nov. 12, 1968

3,409,939
APPARATUS FOR THE MANUFACTURE
OF HOLLOW ARTICLES
Arie Hey, Hendrik-Ido-Ambracht, Netherlands, assignor to Lever Brothers Company, New York, N.Y., a corporation of Maine
Filed Nov. 29, 1965, Ser. No. 510,320
14 Claims. (Cl. 18—5)

ABSTRACT OF THE DISCLOSURE

A method and apparatus for manufacturing thin-walled hollow articles from a thermoplastic material, in which a metered slug of the material is deposited in the cavity of a heated die to render the thermoplastic material in a molten condition. Next, pressure is applied to the molten thermoplastic material by a stamping element to produce a preform of the material conforming to the shape of the die cavity. Subsequently, the material preform is drawn into the cavity of a mold by the application of differential pressure to the interior of the mold cavity to conform the preform to the shape of the article to be manufactured.

---

The invention relates to the moulding of thermoplastics and in particular to the manufacture of hollow articles, for example thin-walled plastic containers.

The main object of the present invention is to provide an apparatus for the manufacture of hollow articles in a continuous cycle of operations, in which there is substantially no wastage of the basic material used.

It is a further object of the invention to provide apparatus as aforesaid which is especially suitable for use with unplasticized thermoplastic materials, such as food grade polyvinyl chloride of high melting point. It is well known in the art that it is difficult to injection-mould material of this type to form thin-walled cup-like containers such as beakers for margarine.

The difficulties are due partly to the decomposition risk inherent in the rather weak stabilizer system of food grade polyvinyl chloride, but mainly to the high viscosity of unplasticized polyvinyl chlorides, and the invention seeks to solve the problem of the unacceptably high flow characteristics of molten unplasticized polyvinyl chlorides when attempting to injection-mould thin-walled containers.

According to the invention there is provided apparatus for manufacturing hollow articles, e.g., thin-walled containers of thermoplastic material, which comprises means adapted to deliver a slug in a metered quantity, a heatable die arranged to receive the slug in its cavity, means for forming the slug into a required first shape or preform and vacuum-moulding or deep-drawing means arranged to form the preform into the required final shape.

In the preferred embodiment of the invention, the apparatus consists of two horizontal rotary tables, both provided with at least three cavities spaced in equidistant relationship on a circle, the tables being arranged for intermittent rotation around their respective vertical axes and being positioned partly superimposed to each other so as to have one position wherein a cavity in one of the tables is in alignment with a corresponding cavity in the other table, a depositing means and a stamp or punch in spaced relationship to each other, both being stationarily arranged above one of the tables, and vacuum-creating means, cooling means, and ejection means being provided for the second rotary table. The depositing means and the stamp or punch may conveniently be combined in one piece of equipment, in which case advantage may be taken of a certain build-up of pressure in the material at the moment when the punch is stamping the slug in the required preform, which build-up of pressure assists in softening the preform as well as the unextruded part of the material still present in the injection head.

The invention will now be described with reference to the accompanying diagrammatic drawings, in which:

FIGURE 1 is a schematic vertical section depicting one embodiment of the invention;

FIGURE 2 is a schematic plan view of an alternative preferred embodiment according to the invention, provided with two rotary tables;

FIGURE 3 is a vertical elevation, partly in section of the embodiment shown in FIGURE 2.

Referring to FIGURE 1, an apparatus for carrying out the invention consists basically of an extrusion head 1 capable of depositing a predetermined amount of the material to be used in a molten condition into the cavity 2 of a die. Instead of metering the required amount of material by means of, e.g., a valve in the extrusion head 1, this operation may be effected in generally known manner by cutting off a slug of the required size from extruded material issuing from the extrusion head 1. In order to keep the material in a molten condition, the die is heated to a predetermined temperature, which is preferably controlled by a thermostat. The slug so injected in the die need not have a definite shape. The extrusion head 1 may be moved, either by hand or automatically, in such a way that the slug of material will be deposited in the centre of the die.

In FIGURE 1 the extrusion head is shown in a position making an angle of about 45° with the vertical, and is kept clear of the punch 3, which makes a downward movement as the next step. In an alternative embodiment (not shown) it may be possible to combine the extrusion head with the punch in a unitary piece of equipment, so that the extrusion of molten material will take place directly above the centre of the die 2.

In the next step the punch 3 is lowered, stamping the slug in the required preform, in which the heat-softened plastic material substantially fills the entire die. This preform may have the configuration of a disk, or any other required configuration, dependent on the space available between the punch 3 and the wall and bottom of the die 2. As explained above, in case a combined punch and extrusion head is used, the latter having its mouth in open connection with the cavity 2 of the die, advantage may be taken of a certain build-up in pressure in the plastic material during the deformation of the slug and especially at the moment when the preform has filled the entire available space in the cavity of the die. This build-up of pressure in the plastic material may conveniently be used to initiate the next step in the cycle, which consists of the operation of giving the product its final shape.

This may be carried out either as a deep-drawing process or as a vacuum-moulding process. In FIGURE 1 the last mentioned alternative is illustrated. The bottom of the die is constructed as a piston 4, which may be withdrawn in a downward direction, while either simultaneously through the centre of the piston rod 5, or as shown in FIGURE 1 at the end of the stroke through the oblique channel 6, vacuum is applied underneath the preform, so that the heat-softened plastic material is vacuum-moulded into the shape of the walls of the cavity 7. The vacuum-channel 6 is connected to a series of apertures in the wall of the cavity 7, as shown in FIG. 1.

In order to carry out a deep-drawing process, the punch 3 may be constructed in two portions (not shown), the inner portion being telescoped downwardly in order to effect the deep-drawing process.

When the product has acquired its final form, it has to be cooled, if necessary, in order to harden in this configuration, the cooling being carried out in any conventional manner, while afterwards the hardened product has to be ejected from the mould. This may be carried out either by supplying air-pressure through the oblique channel 6, or by lifting the piston 4 and piston rod 5, so ejecting the formed product from the cavity 7.

The preferred embodiment of the apparatus for effecting the method according to the invention is shown in FIGURES 2 and 3. Two rotary tables 8 and 9 are arranged in a partly superimposed position, both having four cavities formed therein. The rotary tables are adapted to rotate intermittently over 90°, so that the four cavities in both tables will reach a station 10 in which the corresponding cavities are substantially in alignment with each other.

An extrusion head 11 is provided directly above one of the stations of the lower rotary table 8, so that an exactly dosed or cut off quantity of the plasticized material may be deposited in the cavity, which acts as a die. In the next station a punch 12 stamps the slug 13 in the required configuration, which in this instance will be in the shape of a disk. In the third station 10 of the lower rotary table the preform will come into alignment with the cavity 14 in the upper rotary table 9. In this position vacuum may be applied to this cavity 14, through a channel 15 so that the preform, which still is in a plasticized condition on account of the fact that the lower rotary table thermostatically is kept heated to the required temperature, may be vacuum-moulded into the cavity 14, being presented by the upper rotary table 9.

The so moulded article in this station 10 is taken over by the upper rotary table 9 and in the next intermittent step is rotated to a station 16, in which the finished product may be cooled to set in its ultimate form, while maintaining the vacuum in order to keep the product in its cavity. In the next station 17 the vacuum may be lifted and pressurised air is applied, as indicated at 18, so as to eject the finished product 19 from the second rotary table 9. In order to facilitate ejection, the wall of the cavities 14 may conveniently define the shape of a truncated cone.

Also in this embodiment the extrusion head and the punch may be combined in a unitary piece of equipment. The number of cavities in the rotary tables may be limited to three, in which case the intermittent rotation will be over 120°. If required for additional operations on the product, the number of cavities and consequently of stations in the intermittent rotation may conveniently be increased.

The difficulties encountered when attempting to injection-mould thin-walled containers from unplasticized polyvinyl chloride of high melting point, and the solution to the problem provided by this invention, are illustrated by the following example:

The difficulties do not lie in the injection-moulding cylinders nor in the geometrical design of feed screws, but in the flow ratio of the molten unplasticized polyvinyl chlorides. This flow ratio is the length of the material flow divided by the wall thickness of an article to be injection-moulded.

Supposing that it is intended to copy an existing paperboard margarine cup in unplasticized polyvinyl chloride, with an overall wall thickness of 400 microns, calculations show that the flow ratio will be 1:250. In the case of injection-moulding a preform as a simple disc of 400 microns thickness and 100 mm. diameter using a central sprue, the flow ratio will be 50/0.4=1:125. Since part of the injected material freezes on the cold walls of the injection mould, it is to be expected that the flow ratio will be higher than both the abovementioned figures.

Taking into account the fact that an injection-moulding process with restricted gating is the only process which provides a cup not requiring further finishing, this means that the injection pressure only acts upon a few tenths of a square centimetre. Therefore an unplasticized food grade polyvinyl chloride is ruled out, since the injection velocity must be so high that the molten material does not freeze on the gate or in the mould before the mould is filled, but at the same time the material must not decompose under the heat developed by high shear in the gate.

In comparison with the above, the calculations for the process according to the invention are as follows:

A metered or cut off slug of 4.5 grams of unplasticized food grade polyvinyl chloride is fed into the cavity of the heated die, and the slug is stamped by the punch to form a disc of 100 mm. in diameter 400 microns in thickness. When the clearance between the punch and the bottom of the die cavity is 4 mm. the diameter of the slug is 32 mm. and the flow ratio is 1:8.5. During the stamping process the flow ratio increases steadily to a maximum of 1:18 when the diameter of the slug is 64 mm. and its thickness is 1 mm., and drops to zero when the slug becomes a disc of 100 mm. in diameter and 400 microns in thickness.

Thus it will be seen that the flow ratio is much lower and remains within reasonable limits, and moreover the pressure on the slug is acting on its entire area, which area is constantly increasing until it reaches its maximum, whereas with injection-moulding the pressure acts only on a few tenths of a square centimetre.

I claim:

1. Apparatus for manufacturing hollow articles, such as thin-walled containers, of thermoplastic material, comprising a heatable die having a cavity, means for depositing a slug of the material in a flowable condition, having no particular shape but in a metered quantity, in the die cavity, means for stamping said slug to conform it to the shape of said cavity to produce a preform, and means for molding said preform to the final shape of the desired hollow article by differential gaseous pressure.

2. Apparatus for manufacturing hollow articles, comprising the combination of material depositing means operative to deliver a slug of thermoplastic material in a metered quantity, a heatable die having a cavity for receiving said slug, a stamping element co-operating with said die to conform the slug to the shape of said cavity and produce a preform, and moulding means for forming the preform to the final shape of the desired hollow article by differential gaseous pressure.

3. Apparatus for manufacturing hollow articles, comprising the combination of a first horizontal table rotatable intermittently about a vertical axis and having at least three upwardly-open die cavities in its upper surface spaced in equidistant relationship on a circle, a second horizontal table rotatable intermittently about a vertical axis and positioned to be partly superimposed upon the first table in overlapping relationship and having at least three downwardly-open mould cavities in its lower surface spaced in equidistant relationship on a circle for each of the mould cavities in the second table to register with a respective die cavity in the first table during the intermittent rotation of said tables, extrusion means above the first table for depositing a slug of thermoplastic material in one of said die cavities, stamp means above the first table and spaced from said extrusion means by a distance equal to the spacing between adjacent die cavities in said table so that said stamp means is above another of said die cavities, and vacuum-forming means, cooling means and ejection means for said second table.

4. Apparatus for manufacturing hollow articles from a thermoplastic material comprising a die having a cavity of which the cross section is shaped to conform to the geometry of a plasticized material preform from which the article may be moulded, means for depositing a given amount of the thermoplastic material in the die cavity, pressure element means cooperative with the die cavity for conforming the deposited material to the shape of the die to produce a preform of the deposited material, having a given thickness, and moulding means adjacent the die cavity providing a mould cavity corresponding to the shape of the article to be manufactured and including means for drawing the preform to the interior of the mould to conform it to the interior surface thereof.

5. Apparatus according to claim 4, in which the mould has an aperture through which differential pressure may be applied to the preform.

6. Apparatus as defined in claim 4, in which the moulding means comprises a cylinder providing the interior surface corresponding to the shape of the article to be manufactured, and a piston within the cylinder movable between a first position in which an upper surface of the piston provides a bottom surface of the die cavity upon which the material is deposited, and a second position in which a vacuum is created in the interior of the cylinder to draw the preform thereinto.

7. Apparatus as recited in claim 4, in which the die comprises a first turntable rotatable about an axis normal thereto and having an upper surface provided with a plurality of cavities spaced from the axis, and a second turntable rotatable about an axis parallel to the axis of the first turntable in partly superimposed contact with the first turntable, the second turntable having a plurality of mould cavities spaced from its axis and positioned so that one mould cavity is in communicating registration with one die cavity in the first turntable.

8. Apparatus according to claim 7, in which the respective die and mould cavities are each equidistant from the respective axis and from each other.

9. Apparatus according to claim 7, in which at least one die cavity is in non-superimposed relation to the second turntable when said one die cavity and said one mould cavity are in registration.

10. Apparatus according to claim 9, in which at least one other mould cavity is in non-superimposed relation to the first turntable when said one die cavity and said one mould cavity are in registration.

11. Apparatus according to claim 7, in which the material depositing means extrudes a given amount of the material into the non-superimposed die cavity.

12. Apparatus according to claim 7, in which the pressure element means is positioned at a station over the path of the die cavities upon movement of the first turntable.

13. Apparatus as defined in claim 12, in which the pressure element station is displaced from the position of the die cavity during deposit of the material thereinto.

14. Apparatus according to claim 4, in which the moulding means includes means for alternately applying subatmospheric and superatmospheric pressure to the interior of the mould cavity to draw the preform into the mould cavity and eject the formed article, respectively.

References Cited

UNITED STATES PATENTS

| | | | |
|---|---|---|---|
| 2,854,694 | 10/1958 | Mumford | 18—19 X |
| 3,159,698 | 12/1964 | Suh et al. | |
| 3,161,915 | 12/1964 | Theil | 18—19 |
| 3,235,638 | 2/1966 | Winstead | 18—19 X |
| 3,278,985 | 10/1966 | Everett | 18—19 X |
| 3,305,158 | 2/1967 | Whiteford | 18—19 X |
| 3,333,571 | 8/1967 | Kokinda. | |
| 3,342,914 | 9/1967 | Edwards | 264—92 X |

J. HOWARD FLINT, JR., *Primary Examiner.*